US010169817B2

United States Patent
Haley et al.

(10) Patent No.: US 10,169,817 B2
(45) Date of Patent: Jan. 1, 2019

(54) DYNAMIC STORAGE BANDWIDTH ALLOCATION

(71) Applicant: International Business Machines Corporation, Armonk, NY (US)

(72) Inventors: Stephen A. Haley, Round Rock, TX (US); Brian W. Hart, Austin, TX (US); Anil Kalavakolanu, Austin, TX (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 14/859,462

(22) Filed: Sep. 21, 2015

(65) Prior Publication Data

US 2016/0087912 A1    Mar. 24, 2016

Related U.S. Application Data

(63) Continuation of application No. 14/495,075, filed on Sep. 24, 2014.

(51) Int. Cl.
  *G06Q 40/04*    (2012.01)
  *G06Q 30/08*    (2012.01)
  (Continued)

(52) U.S. Cl.
  CPC .............. *G06Q 40/04* (2013.01); *G06Q 30/08* (2013.01); *H04L 41/0896* (2013.01); *H04L 41/30* (2013.01); *H04L 65/4076* (2013.01)

(58) Field of Classification Search
  CPC .............. G06Q 30/0275; G06Q 30/08; G06Q 30/0254; G06Q 30/0605; G06Q 30/0269;
  (Continued)

(56) References Cited

U.S. PATENT DOCUMENTS 5,640,569 A * 6/1997 Miller ...................... G06F 9/50
                                                                  705/37
7,139,271 B1  11/2006 Parruck et al.
(Continued)

FOREIGN PATENT DOCUMENTS

WO        0117183 A1    3/2001

OTHER PUBLICATIONS

Enhanced Optical Services Put the User in Charge—Innovations in provisioning optical wavelengths could usher in a bandwidth-rich, flexible transport model that can be provisioned by the end user, Allen, Doug. Network Magazine: 102. United Business Media LLC. (Sep. 1, 2000).*

(Continued)

*Primary Examiner* — Lalita M Hamilton
(74) *Attorney, Agent, or Firm* — Peter J. Edwards

(57) ABSTRACT

A computer system, method, and program product for dynamically allocating storage bandwidth in an exchange is provided. The method provided creates, by an exchange server, a total inventory of resources for auction, whereby the total inventory of resources for auction includes resources from at least one provider. The total inventory of resources for auction is broadcast to at least one bidder. The amount of a resource is awarded to the at least one bidder at an end of a bidding interval, based on a bid provided by the at least one bidder during the bidding interval, where the amount of the resource is a portion of the total inventory of resources for auction.

6 Claims, 5 Drawing Sheets

(51) Int. Cl.
*H04L 29/06* (2006.01)
*H04L 12/24* (2006.01)

(58) Field of Classification Search
CPC ...... G06Q 40/04; G06Q 40/00; G06Q 50/188; G06F 9/50; H04L 41/0896; H04L 41/30; H04L 65/4076
See application file for complete search history.

(56) References Cited

U.S. PATENT DOCUMENTS

| | | |
|---|---|---|
| 7,426,572 B1 | 9/2008 | Sindhu et al. |
| 8,176,289 B2 | 5/2012 | Frank |
| 9,531,607 B1 | 12/2016 | Pai et al. |
| 2002/0136230 A1 | 9/2002 | Dell et al. |
| 2002/0174054 A1 | 11/2002 | Grey et al. |
| 2003/0137934 A1 | 7/2003 | Schaller et al. |
| 2004/0010592 A1 | 1/2004 | Carver et al. |
| 2006/0206682 A1 | 9/2006 | Manbert et al. |
| 2008/0046917 A1 | 2/2008 | de Heer |
| 2008/0240139 A1 | 10/2008 | Kodialam et al. |
| 2009/0006647 A1 | 1/2009 | Balonado et al. |
| 2010/0106332 A1 | 4/2010 | Chassin et al. |
| 2011/0252166 A1 | 10/2011 | Padala et al. |
| 2012/0278221 A1 | 11/2012 | Fuller et al. |
| 2012/0304171 A1 | 11/2012 | Joshi et al. |
| 2013/0179291 A1 | 7/2013 | Phan et al. |
| 2014/0074641 A1 | 3/2014 | Wang |
| 2014/0279136 A1 | 9/2014 | Pacella et al. |
| 2014/0324532 A1 | 10/2014 | Ghosh et al. |
| 2014/0359638 A1 | 12/2014 | de Lima et al. |

OTHER PUBLICATIONS

Haley et al., "Dynamic Storage Bandwidth Allocation", U.S. Appl. No. 14/495,075, filed Sep. 24, 2014.

List of IBM Patents or Patent Applications Treated as Related, dated Sep. 18, 2015, pp. 1-2.

\* cited by examiner

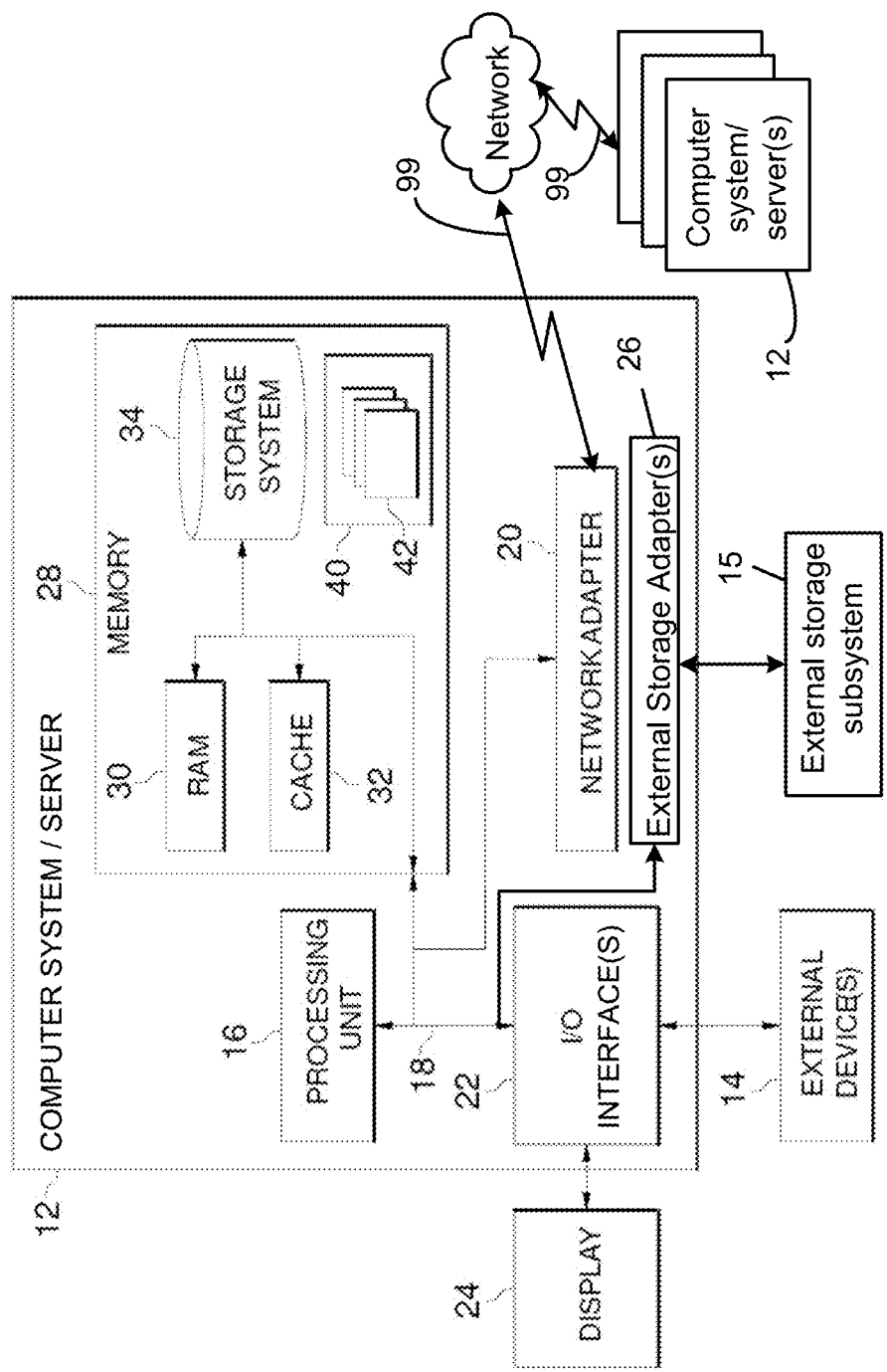

DYNAMIC STORAGE BANDWIDTH ALLOCATION

FIELD OF THE INVENTION

This disclosure relates generally to data storage management, and more particularly to dynamically allocating data storage bandwidth.

BACKGROUND

In modern storage networks, a single storage device or single storage subsystem is commonly attached to multiple computer hosts. In this context, a storage subsystem is an integrated collection of storage controllers, devices such as disks and tapes, and any required control software. A storage network includes storage subsystems that share a high-speed network connection to deliver data transfer and storage services to computer hosts. Storage devices typically have constraints, also referred to as choke points that limit their performance, both in terms of total number of Input/Output (I/O) commands and in I/O bandwidth transferred. For example, a single storage network, such as a Storage Area Network (SAN), may have limitations on the number of concurrent I/O commands at the overall storage unit level. Additional and separate limitations exist at the Host Bus Adapter (HBA) port (i.e., storage subsystem connection point to the host), at the internal disk drive controller, and finally at the internal physical disk drives themselves. Rather than representing an aggregate for all the components of the storage subsystem, each of the limitations is specific to the particular element of the storage subsystem. In order to develop a statistically accurate performance profile for a computer or storage subsystem, a systems administrator gathers performance data over an extended period of time. However, as this is a time consuming process, the systems administrator may manually calculate appropriate values for I/O tuning parameters for each host using a limited amount of performance data gathered at a static point-in-time. Consequently, tuning parameters calculated in this manner typically lack the complexity to accommodate the performance needs of each of the workloads running on the computer system. Additionally, adding or removing a computer host from the storage subsystem environment dynamically changes the demands on the storage device, highlighting the inadequacy of static tunings on the computer hosts to respond efficiently. Therefore, performance tuning using simple, static tunings fails to achieve optimum utilization of the storage subsystem. Capacity within a storage network may be apportioned more effectively when a mechanism exists to coordinate the available storage capacity with the I/O requirements of the host computers.

SUMMARY

According to one embodiment, a method for dynamically allocating storage bandwidth in an exchange comprises: creating, by an exchange server, a total inventory of resources for auction, whereby the total inventory of resources for auction comprises resources from at least one provider; broadcasting the total inventory of resources for auction to at least one bidder; and awarding an amount of a resource to the at least one bidder at an end of a bidding interval, based on a bid provided by the at least one bidder during the bidding interval, whereby the amount of the resource is a portion of the total inventory of resources for auction.

According to another embodiment, a computer program product for dynamically allocating storage bandwidth in an exchange comprises: a computer readable storage medium readable by a processing circuit and storing instructions for execution by the processing circuit for performing a method comprising: creating, by an exchange server, a total inventory of resources for auction, whereby the total inventory of resources for auction comprises resources from at least one provider; broadcasting the total inventory of resources for auction to at least one bidder; and awarding an amount of a resource to the at least one bidder at an end of a bidding interval, based on a bid provided by the at least one bidder during the bidding interval, whereby the amount of the resource is a portion of the total inventory of resources for auction.

According to another embodiment, a computer system for dynamically allocating storage bandwidth in an exchange comprises a memory, a processing unit communicatively coupled to the memory, and a management module communicatively coupled to the memory and processing unit, whereby the management module is configured to perform the steps of a method comprising: creating, by an exchange server, a total inventory of resources for auction, whereby the total inventory of resources for auction comprises resources from at least one provider; broadcasting the total inventory of resources for auction to at least one bidder; and awarding an amount of a resource to the at least one bidder at an end of a bidding interval, based on a bid provided by the at least one bidder during the bidding interval, whereby the amount of the resource is a portion of the total inventory of resources for auction.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 1A illustrates an exemplary computing node operable for various embodiments of the disclosure.

DETAILED DESCRIPTION

Figure 1B:
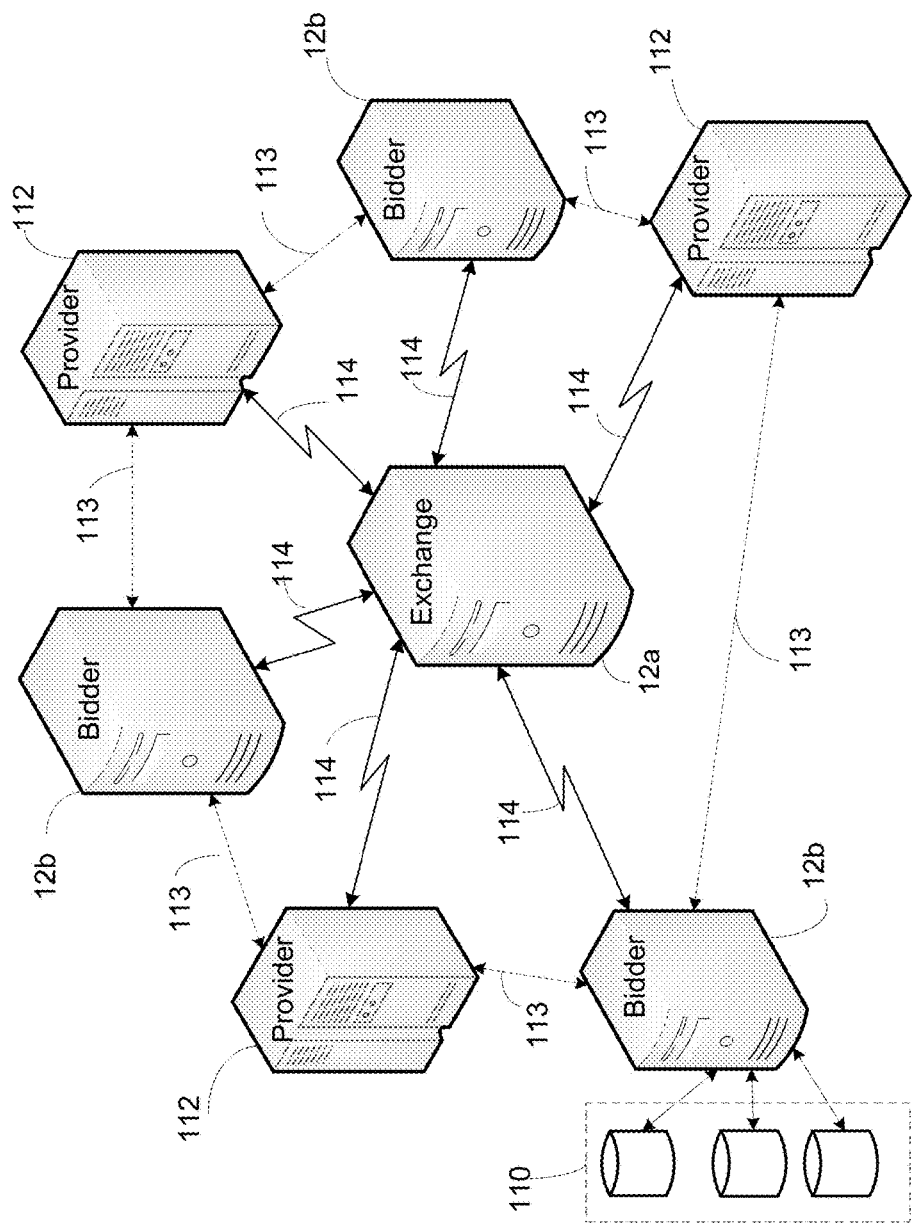
FIG. 1B illustrates a bid and exchange environment according to various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of data storage management, and more particularly to dynamically allocating data storage bandwidth. The following described exemplary embodiments provide a system, method and program product to provide a mechanism for the various hosts in a storage network configuration to coordinate their requirements about their I/O demands to a storage system, thereby allowing the storage network to apportion capacity more effectively among the hosts.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Turning now to FIG. 1A, a block diagram of an exemplary computer system/server (server) 12 operable for various embodiments of the disclosure is presented. As shown, the server 12 is only one example of a suitable server for executing the program instructions of an exchange server, or for interacting with the exchange server as a bidder server, and is not intended to suggest any limitation as to the scope of use or functionality of embodiments of the disclosure described herein. Regardless, the server 12 is capable of being implemented and/or performing any of the functionality of an exchange server or a bidder server.

When configured as either an exchange server or as a bidder server, the server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by servers 12 in both local and remote computer systems that are linked together and communicate through a communications network, such as the network 99.

The server 12 may be described in the context of executable instructions, such as a program 40 and one or more program modules 42, being executed by the processing unit of a computer system. Program modules 42 perform particular tasks or implement particular data types, and may be organized as routines, programs, objects, components, logic, or data structures, for example. As will be further depicted and described below, the memory 28 may include at least one program product having a set (e.g., at least one) of program modules that are configured to carry out the specialized functions of embodiments of the disclosure. For example, a server 12 configured as an exchange server includes a program 40, i.e., an agent, having program modules 42 that execute the algorithms of FIGS. 2 and 3. The functions of the program 40, include periodically polling subscriber members of the exchange environment for bids and available resources; sorting and tabulating bids and available resources; determining and awarding resources to winning bidders; and calculating and managing accounts of the bidders. When configured to perform the functions of an exchange server, the program 40 may be an agent on the server 12. For a server 12 configured as a bidder server, the program 40, i.e., agent, includes program modules 42 having program instructions to respond to polling requests from the exchange server; analyze the resource requirements; create and transmit a bidding schedule to the exchange server, based on the required resources and the available number of units for bidding; and applying rules or statistics to calculate a re-bid. The provider 112 includes an embodiment of the server 12, which may also be referred to as a controller or control unit. When configured as a controller, the server 12, includes an agent, i.e., the program 40, for managing the operations of the provider 112, such as: receiving and responding to storage requests, maintaining an inventory of resources; and communicating with the exchange server. In a distributed cloud computing environment, the program 40 and the program modules 42 may be located in local and remote computer system storage media including memory storage devices.

As shown in FIG. 1A, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the operating system, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via Input/Output (I/O) interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the system/server 12 via bus 18. For a server 12 that is configured as a bidder server, an external storage subsystem 15, such as a storage area network (SAN) or RAID array, is connected to the server 12 by an external storage adapter 26. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

As shown, FIG. 1B illustrates an exemplary bid and exchange environment according to various embodiments of the disclosure. The providers 112 supply constrained resources, such as access to disk storage, or a percentage of I/O bandwidth on the network 113 between a provider 112 and a bidder server 12b. Exemplary providers 112 include SAN, RAID arrays, magnetic tape libraries, and optical disk libraries. A server 12 of FIG. 1A is shown as a dedicated exchange server 12a, as one or more bidder servers 12b, and as the controller component of each of the providers 112.

The bidder servers 12b are consumers of the resources from the providers 112. For example, a bidder server 12b may be a computer system that hosts a database and/or an application, and that issues I/O requests to be processed using a provider's 112 disk storage. The exchange server 12a is a logical coordinator of requests and responses from bidder servers 12b and the providers 112. As such, the exchange server 12a is logically connected to each bidder server 12b and provider 112 through a network 114, over which the participants in the exchange environment communicate. The bidder servers 12b are connected by a network 113 to the providers 112. In operation, a bidder server 12b may be connected to the one or more providers 112 from which the bidder server 12b receives resources. However, in a high-availability implementation, redundant network connections provide alternate paths between the bidder servers 12b and providers 112, even when a particular bidder server 12b is not interested in bidding for resources from that particular provider 112. Further, as shown by disk 110, some storage may be attached to a bidder server 12b, yet not participate in the exchange environment. Although shown as generic disk storage, the disk 110 may also be a SAN, RAID array, tape library, etc. Each bidder server 12b and provider 112 that participates in the exchange environment communicates with the exchange server 12a so that the exchange server 12a may coordinate the bids and resources in the exchange environment. Because they are connected through the networks 113 and 114, the participants in the exchange environment may be co-located or geographically dispersed.

As will be described in greater detail with reference to FIG. 2, the participants in the exchange environment interact as follows. A provider 112 sends information to the exchange server 12a about the types of resources it can provide, along with any constraints. For example, a SAN subsystem may notify the exchange server 12a that it can support a maximum queue depth of "40". Queue depth refers to the number of I/O operations queued to a disk drive. Other resources include: the maximum data transfer sizes the storage device supports, for example "256" KB or "1" MB; a RAID level, such as RAID "0" or RAID "1", which specifies data redundancy; and a maximum number of requests that can be outstanding on a disk adapter. Each participating bidder server 12b sends its request for resources to the exchange server 12a, along with its bid, expressed as the number of required and cost units. For example, a bidder server 12b requests "20" queue depth slots on a particular disk provider, for which it bids "10" cost units each. The exchange server 12a receives this bidder server's request, along with those from other bidder servers that participate in the exchange. Other bidder servers 12b may also be bidding for this provider's 112 queue depth slots. Consequently, the original bidder server 12b may either lose to one of them or may be successful in its bid, depending upon the results of the exchange server's 12a calculations. Additionally, bids may be partially successful. The bidder server 12b may be awarded "12" of its "20" requested queue depth slots at its bid price of "10" cost units per slot.

Figure 2:
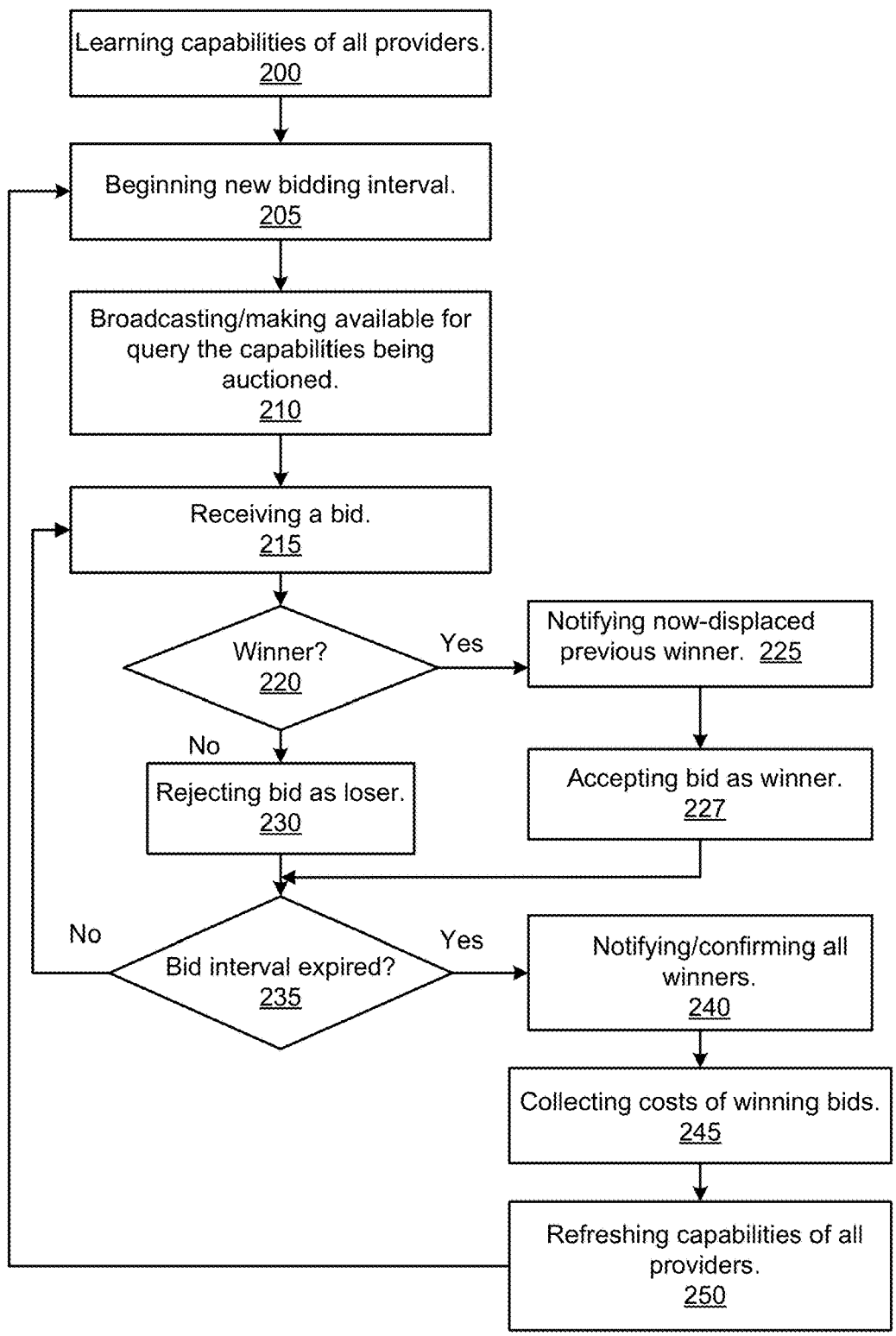
FIG. 2 is an operational flowchart illustrating an algorithm for dynamically allocating data storage bandwidth, according to various embodiments of the disclosure.

FIG. 2 describes an exemplary embodiment of a process for dynamically allocating data storage bandwidth from the exchange server's 12a point of view. References to the exchange server 12a, the bidder server 12b, the provider 112, and the networks 113 and 114 as used in relation to FIG. 2, refer to the elements as described above with reference to FIG. 1B.

While the embodiments of the invention are described with reference to the queue depth parameter as used in SAN, RAID arrays, and similar storage technologies, other applications may be contemplated. This includes, for example, a dedicated percentage of the bandwidth of the connection between the bidder server 12b and the provider 112, which is typically expressed in gigabytes per second. In another embodiment, the present disclosure may be extended to include the Network File System (NFS). NFS is a network-based distributed file system protocol, which allows a server to share directories and files with clients over a network. With NFS, users and programs may access files on remote systems as if they were stored locally. In this context, a bid may specify a number of threads, or file requests, for example "100" file requests to the NFS server, instead of "100" disk I/O requests.

At 200, the exchange server 12a learns the resources, i.e., capabilities, of the providers 112 participating in the exchange. Through software agents installed on the provider 112 and the exchange server 12a and communicating over the network 114, the provider 112 notifies the exchange server 12a that it has certain resources to offer. These resources describe the configured functionality of the storage subsystem, such as: queue depth; a degree of data redundancy, i.e., RAID n; the size of disks available; whether encryption is configured for the disks; the storage type, i.e., fixed block or count key data; and the estimated optimal block transfer size, for example, "8" KB or "16" KB.

Similarly, a specialized software agent is installed on each bidder server 12b participating in the exchange environment. The agent notifies the exchange server 12a that a new bidder server 12b is joining the exchange environment, for example. The agent also sends the bidder server's 12b bids, also referred to as a bid schedule, to the exchange server 12a, and maintains a count of the total number of cost units the bidder server 12b has available for bidding. Upon joining the exchange environment, the agent may optionally send the total number of units available for bidding to the exchange server 12a. The exchange server 12a may use this total number of units available for bidding to associate each bidder server 12b with an account on the exchange server 12a. The account may include the total number of units available for bidding and an account identifier that is associated with the bidder server 12b.

When the resources of a provider 112 change, for example upon allocation of I/O queue depth slots to a bidder server 12b, or the addition of more disk capacity, the provider 112 notifies the exchange server 12a of the change. Upon receiving the notification, the exchange server 12a updates its inventory of resources for the provider 112. As may well be appreciated, the inventory of resources and the account data may be organized in various well-known formats, such as a database, file, array, linked list, or table.

At 205, a new bidding interval begins. The bidding interval is a configurable time period, for example two minutes, during which the bidder servers 12b contact the exchange server 12a with their resource requirements and associated bid schedules. The bidding interval may be tunable for optimum performance in the exchange environment.

At 210, as a new bidding interval begins, the exchange server 12a consolidates the resources that the participating providers 112 have available to offer, and broadcasts this information to the participating bidder servers 12b. Subsequently, the bidder servers 12b, described below with reference to FIG. 3, bid for preferential access to the resources.

At 215, the exchange server 12a receives and evaluates the bid schedules, i.e., bids, from the bidder servers 12b. In one embodiment, the exchange server 12a may evaluate each bid as it is received during the open bidding interval. Alternatively, the exchange server 12a may collect all the bids, sorting them, for example, by provider 112, resource, the bidder servers 12b seeking the resource, and their respective bid amounts.

If at 220 a particular bid is not the highest for a particular resource, at 230 the bid is rejected and discarded. If at 235 the bidding interval has not expired, the next bid is received and evaluated at 215.

However, if at 220 the current (received) bid is the highest, at 225 the previous high-bidder is notified that its bid is not successful, and it is replaced by the current bid. The current high-bid may be the winning bid, at 227, unless a higher bid is recognized by the exchange server 12a during the bidding interval.

When at 235 the bidding interval expires, at 240 the exchange server 12a notifies the winning bidder servers 12b. At 245 the exchange server 12a collects the costs of the winning bids from each successful bidder server 12b. If the exchange server 12a optionally maintains bidding accounts for each bidder server 12b in the exchange environment, the exchange server 12a may debit the accounts of the winning bidder servers 12b for the total number of cost units spent on the winning bids, and notify the winning bidder servers 12b of their new updated balances. The agents on the winning bidder servers 12b update their account units accordingly. In this embodiment, the exchange server 12a may immediate disregard the bids of bidder servers 12b whose balance is less than its bid. Alternatively, the exchange server 12a may notify the winning bidder servers 12b to deduct the total number of cost units from their respective local accounts. Alternatively, the exchange server may periodically notify a central accounting authority, such as a central chargeback system within the enterprise, to debit the accounts of the winning bidder servers 12b for the winning total number of cost units. A central chargeback system, also referred to as a computer or Information Technology (IT) chargeback system, is an accounting strategy that apportions the costs of computing services, including hardware and software, to the business units that consume the computing services. Reports from the central chargeback system identify a distribution of heavy, moderate, and light consumers of the computing services. The chargeback system may apportion units for bidding among the subscribers of the exchange environment according to the subscriber's level of usage. Periodically, for example monthly, the number of cost units spent in the exchange environment may be converted to actual cost figures, which then may be charged to operating budgets of the various subscribers.

At 250, the exchange server 12a refreshes the capabilities, i.e., resources offered for bid, prior to beginning a new bidding interval at 205. In processing similar to that at 200, the agent on each provider 112 evaluates and updates the provider's inventory of resources. These may include: new resources added to the provider 112 since the last bidding interval; resources recently returned by bidder servers 12b; and resources allocated to winning bidder servers 12b during the previous bidding interval.

Figure 3:
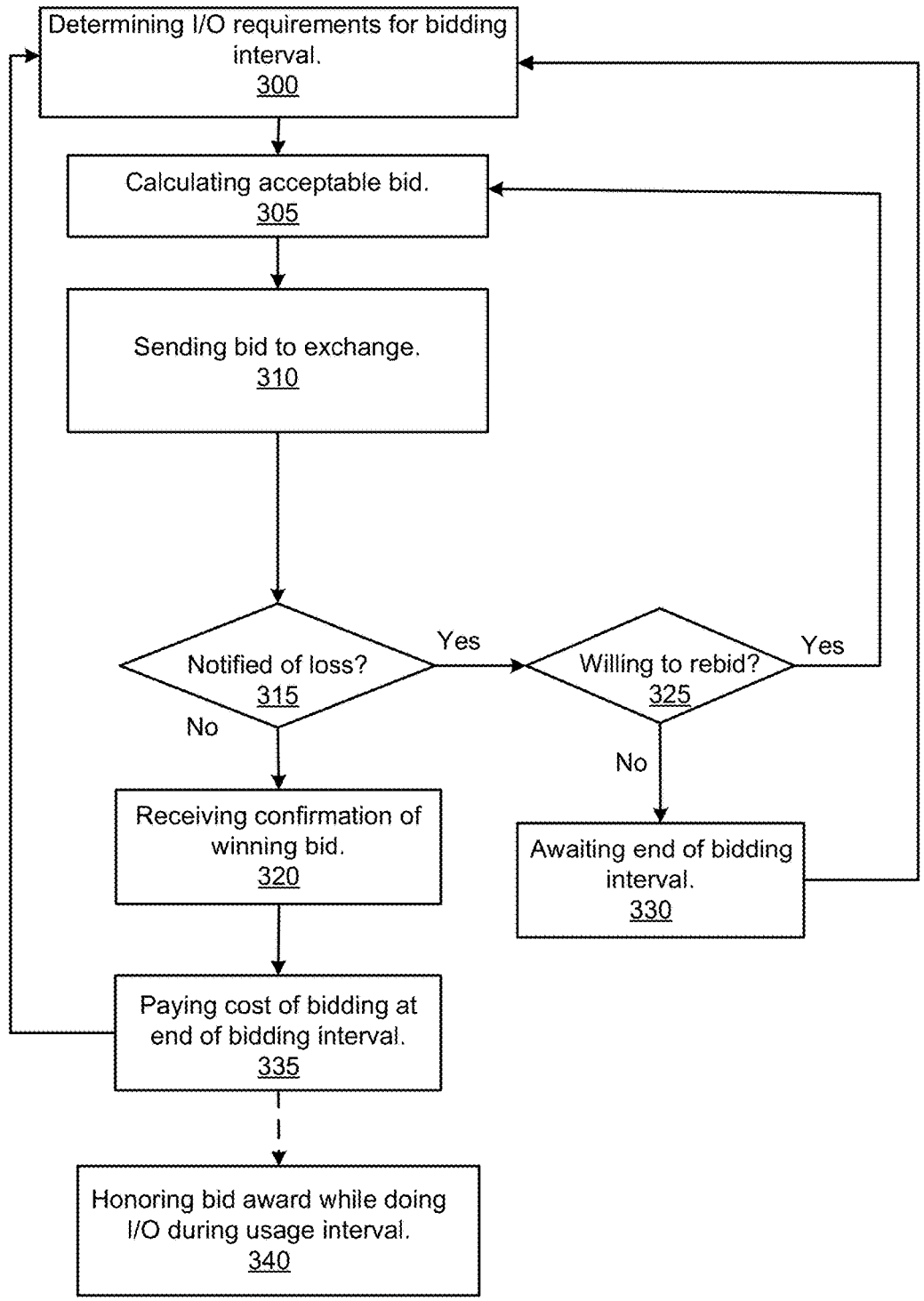
FIG. 3 is an operational flowchart illustrating an algorithm for usage intervals, according to various embodiments of the disclosure.

FIG. 3 describes an exemplary embodiment of an algorithm for dynamically allocating data storage bandwidth from the bidder server's 12b point of view. It should be noted that the algorithm described above with reference to FIG. 2 may execute simultaneously with the execution of the algorithm of FIG. 3. However, the bidding and usage intervals may be of different durations and may overlap, thereby allowing adequate time for notifying the winning bidder servers 12b between the end of the bidding interval and the beginning of the usage interval. References to the exchange server 12a, the bidder server 12b, the provider 112, and the networks 113 and 114 as used in relation to FIG. 3, refer to the elements as described above with reference to FIG. 1B.

At 300, the bidder server 12b determines its I/O requirements for the bidding interval. A system administrator creates an initial bidding schedule for a bidder server 12b based on developing the I/O profile of the workloads on the server. The agent applies rules, which the system administrator configures, to automate submission of subsequent bids. Typically, a computer's system administrator monitors performance through a number of well-known utilities. Performance data may be analyzed by user, application, or for the entire bidder server 12b, depending upon the granularity of data required to develop an effective bidding schedule. For example, on a bidder server 12b hosting a workload that includes several users and applications, the system administrator may gather and analyze performance data on a server-wide basis, or only for each user and application to be included in the bidding schedule.

At 305, a user, such as the system administrator, creates the bidder server's 12b bidding schedule that includes one or more bids that are based on the results of analyzing the performance data. A bid includes an identifier to associate the bid with the bidder, for example the application, a resource, such as a number of slots on a SAN's queue, i.e., queue depth, a source of the resource, such as the logical name of a disk, i.e., disk1, and a number of cost units bid per required unit of resource. The following is an exemplary bid within a bidding schedule:

resource=queue_depth, source=disk1, bid amount=1-10:25, 11-20:15, 21+:0

This bid represents a request for queue depth, i.e., slots in the queue, from the provider 112 that manages disk1. The bidder is willing to pay "25" units for each of the first "10" slots in the queue (i.e., 1-10:25), an additional "15" units for each of the next "10" slots in the queue, but nothing for any additional slots allocated over "20" (i.e., 21+:0). In this example, a specific disk resource is requested, since the bidder server 12b is accessing an existing file. However, in another embodiment, a blank source field may indicate that the bidder server 12b is requesting disk space in which to create a new file. In that case, additional parameters may accompany the bid to identify, for example, the size of the disk required, or a degree of redundancy (i.e., RAID n).

The system administrator may configure bidding ranges, or other constraints that the agent on the bidder server 12b may include when performing analytics and automating the bid process during the subsequent bidding intervals. An exemplary constraint may be to bid no more than a certain number of cost units. Alternatively, if less than a certain percentage of the awarded resource is used, such as "80"

percent, in the next bid, the agent should decrease the amount of resource requested. Since the exchange server 12a has an inventory of the capabilities of the providers 112, the exchange server 12a may select the appropriate resource, if the bidder server 12b wins the bid. The examples and algorithms are presented using the queue depth resource, since it is an easily understood I/O storage constraint. While the embodiments of the invention are described with reference to SAN, RAID arrays, and similar storage technologies, other applications may be contemplated. This includes, for example, a dedicated percentage of the bandwidth of the connection between the bidder server 12b and the provider 112, which is typically expressed in gigabytes per second. In another embodiment, the disclosed framework may be extended to include Network File System (NFS), as described previously with reference to FIG. 2.

At 310, each participating bidder server 12b creates a bidding schedule that includes each bid for each requested resource, and sends the bidding schedule to the exchange server 12a. Several well-known means are available to communicate the bidding schedule to the exchange server 12a. For example, the bidding schedule may be an array or linked list in a memory location that is accessible by the participants in the exchange. Alternatively, the bidding schedule may be a file or table that is written to a disk commonly accessible by all participants in the exchange. In another embodiment, the participants in the exchange may also participate in a message queuing system. Message queuing allows the distributed agents to communicate asynchronously by sending messages between the agents. The messages from the sending agents are stored in a queue and are retrieved by the receiving agents. The agents send or receive messages through a queue by sending a request to the message queuing system.

Following the calculation of winning and losing bids at 215 (FIG. 2), the exchange server 12a communicates the outcome to each bidder server 12b. At 315, if the bidder server 12b has lost a bid, at 325 the agent on the bidder server 12b determines whether to rebid, or to wait until the next bidding interval, at 330. As described previously with reference to 305 of FIG. 3, the agent on the bidder server 12b may apply one or more bidding rules, such as a maximum number of cost units that the agent can bid for each unit of a resource. Alternatively, the agent may create a log of the history of its bidding activity. The agent may apply statistical analytics to its bidding history, as containing in the log, to determine a modified next bid. For example, if the losing bids are consistently within a statistical distribution, the agent may increase its bids by a rule-defined percentage, such as one percent, and continue to monitor the success rate of its bids for possible further modification.

However, at 315 if the bidder server 12b has a successful bid outcome, at 320 the exchange server 12a notifies the bidder server 12b of the award, including the resource that was bid upon, the source of the resource, and the amount of the resource awarded. The following shows the exemplary bid, described previously with reference to 310 of FIG. 3, and an example of a winning award:

resource=queue_depth, source=disk1, bid amount=1-10:25, 11-20:15, 21+:0 resource=queue_depth, source=disk1, awarded=13, cost=295

Here, the bidder server 12b is awarded "13" I/O requests on disk1. The first "10" I/O requests cost "250" units, calculated as "10" I/O requests at "25" cost units each, and the next "3" I/O requests cost "45" units, calculated as "3" I/O requests at "15" cost units each, giving a total cost of "295" units. The bidder server 12b restricts its usage of the resource to the amount awarded as a result of its winning bid.

The exchange server 12a attempts to maximize the total cost units it receives for the resources of the providers 112. Therefore, the highest bidder generally wins. As another example, a provider 112 has "2000" simultaneous I/O requests to sell to two bidder servers 12b. If each bidder server 12b bids one unit each for "500" I/O requests, then both bidder servers 12b receive an award of "500" I/O requests. In another example, the first bidder server 12b bids one unit each for "500" I/O requests, and "0.10" of a unit each for I/O request in excess of "500". The second bidder server 12b bids two units for each of the first "1750" I/O requests, then "0.10" for each I/O request over "1750". To maximize the total cost units received for the provider's 112 resources, the second bidder server 12b is awarded "1750" I/O requests out of the total "2000" I/O requests that are available at a total cost of "3500" units, and the first bidder server 12b is awarded the remaining "250" I/O requests at a total cost of "250" units.

As discussed previously with reference to 235 of FIG. 2, at 335 the amount of the winning bid is deducted from the total number of units allocated to the bidder server 12b for bidding, without regard to the resources actually consumed. If the bidder server 12b is awarded "13" I/O requests, as in the above example, the cost of the award is based on the full "295" I/O requests, even though only "5" I/O requests are actually consumed. This encourages the generation of more accurate bidding schedules, since an unused portion of the awarded bid not only wastes a bidder's IT budget, but also misallocates scarce computing resources.

At 340, the bidder server 12b consumes the resources won during the bidding interval. The agent on the bidder server 12b may log its bidding activity, including the bids placed and the resources awarded. Through analysis of the bidding activity, the agent may adjust its bids based on, for example, how frequently the bidder server 12b fails to consume its awards, how frequently it loses bids, and a change in I/O performance profile.

Figure 4:
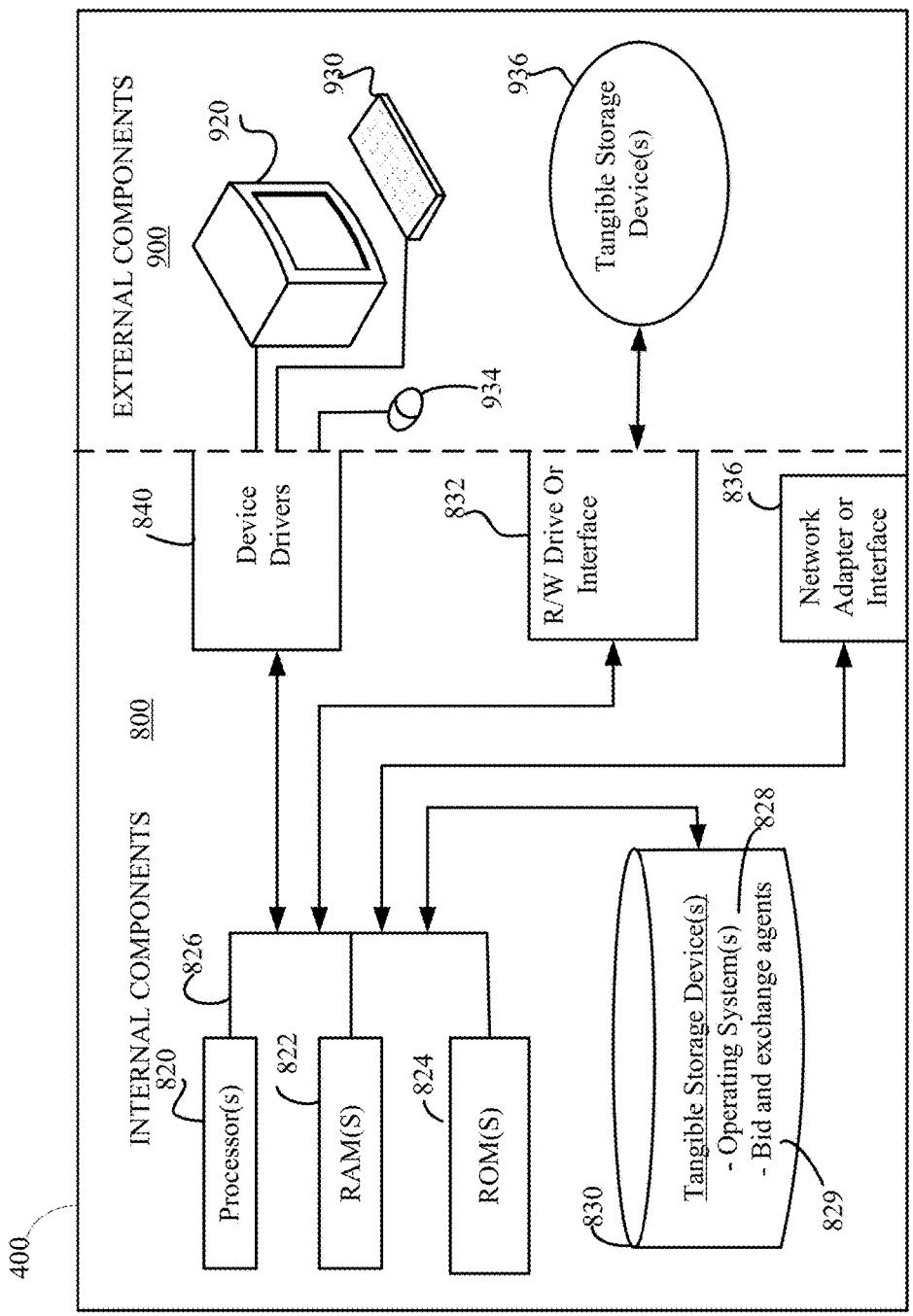
FIG. 4 is a schematic block diagram of hardware and software of the computer environment according to an embodiment of the processes of FIGS. 2 and 3.

Referring now to FIG. 4, computing device 400 may include respective sets of internal components 800 and external components 900 that together may provide an environment for a software application, such as the bid and exchange agent. Each of the sets of internal components 800 includes one or more processors 820; one or more computer-readable RAMs 822; one or more computer-readable ROMs 824 on one or more buses 826; one or more operating systems 828; one or more software applications (e.g., bid, exchange, provider agents 829) executing the method 200-300; and one or more computer-readable tangible storage devices 830. The one or more operating systems 828 and bid, exchange and provider agents 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The bid and exchange agents 829, and operating system 828 that are associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for dynamically allocating storage bandwidth in an exchange, comprising:
receiving a notification of resources of at least one provider, wherein the resources comprise at least bandwidth, the notification comprising at least information about the types of resources provided, amount of resources provided, and constraints of the resources, wherein the at least one provider is participating in the exchange;
creating, by an exchange server, a total inventory of resources for the exchange, wherein creating the total inventory of resources for the exchange comprises consolidating the received notifications of resources from the at least one provider;
broadcasting the total inventory of resources for the exchange to at least one bidder;
receiving a bidding schedule from the at least one bidder, wherein the bidding schedule includes a bid for at least a portion of resources from the resources of the at least one provider, the bidding schedule based on a profile of workloads on the at least one bidder and performance data of the at least one bidder; and
awarding an amount of a resource to the at least one bidder at an end of a bidding interval, based on the bidding schedule from the at least one bidder during the bidding interval, wherein the amount of the resource is a portion of the total inventory of resources for the exchange.

2. The method of claim 1, wherein the at least one bidder limits usage of the awarded resource to the amount of the awarded resource.

3. The method of claim 1, further comprising:
dynamically adjusting the total inventory of resources for the exchange, based on receiving an updated notification of available resources from the at least one provider; and
based on the at least one bidder returning to the at least one provider the amount of the awarded resource no longer being used.

4. The method of claim 1, wherein the exchange server includes an exchange agent configured for:
determining a successful bid from the bidding schedule, based on the successful bid being a highest number of units bid for the amount of the resource;
notifying the at least one bidder having the successful bid of a total cost of the successful bid; and
managing the bidding interval, wherein the exchange agent notifies the at least one provider and the at least one bidder of the start and the end of the bidding interval.

5. The method of claim 1, wherein the at least one bidder includes a bidder agent configured for:
creating the bidding schedule, wherein the bidding schedule comprises a resource name, a number of units of resource desired, and a number of units bid for each unit of resource;
maintaining an account balance of the number of units available to bid, wherein the total cost of the successful bid is deducted from the account balance; and
adjusting a next bid based on at least one of:
an amount of resource consumed;
a ratio of successful bids to unsuccessful bids; and
a percentage of awarded resource left unused.

6. The method of claim 1, wherein the bidding interval is a configurable period of time.

* * * * *